United States Patent Office 3,442,747
Patented May 6, 1969

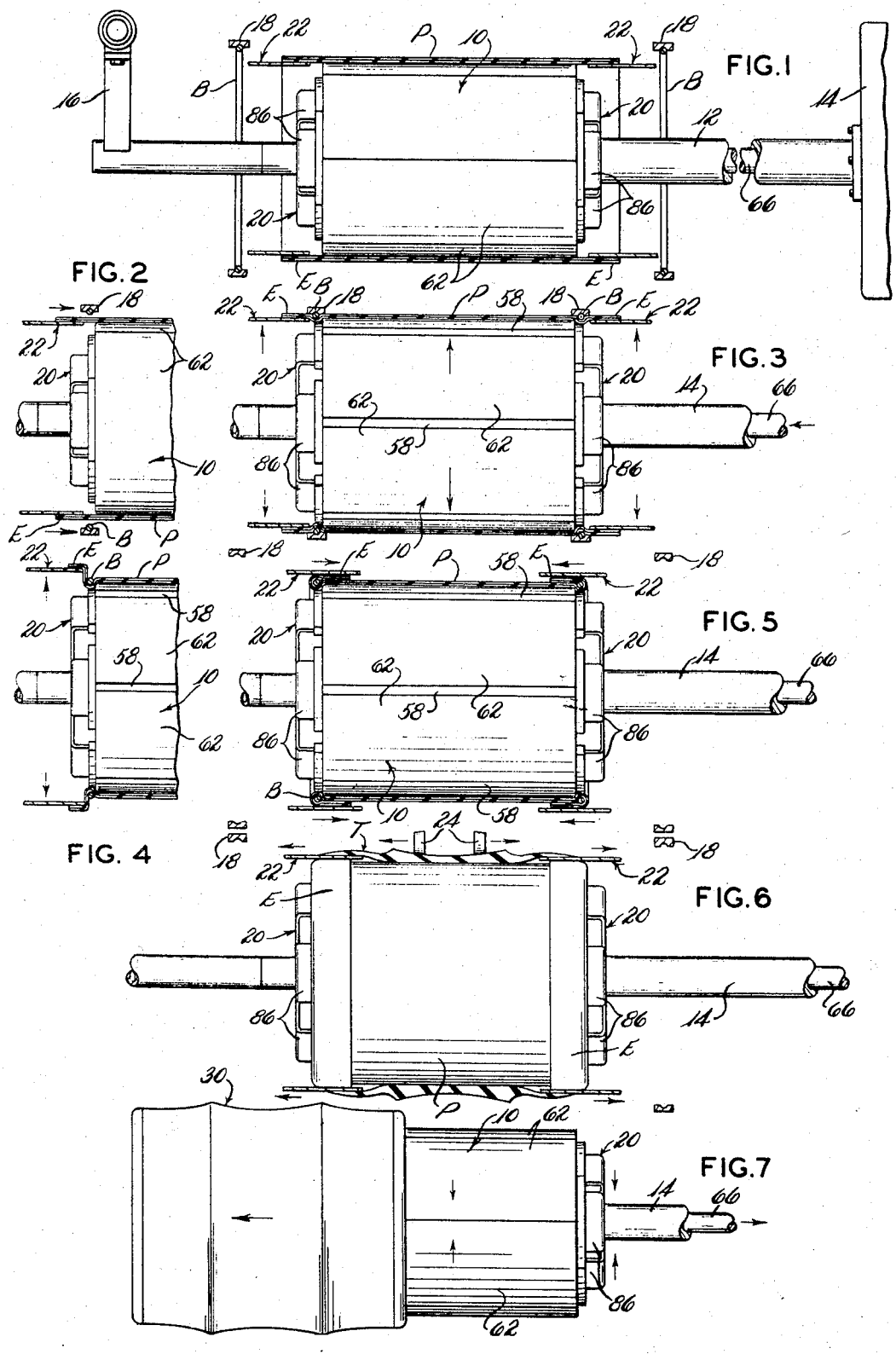

3,442,747
COLLAPSIBLE TIRE BUILDING DRUM
Wilhelm Brey, Cuyahoga Falls, Ohio, assignor to The Firestone Tire & Rubber Company, Akron, Ohio, a corporation of Ohio
Continuation-in-part of application Ser. No. 275,891, Apr. 26, 1963, now Patent No. 3,237,199. This application Dec. 22, 1965, Ser. No. 515,550
The portion of the term of the patent subsequent to Feb. 22, 1983, has been disclaimed
Int. Cl. B29h 17/16
U.S. Cl. 156—417                    3 Claims This application is a continuation-in-part of my copending application Ser. No. 275,891, filed Apr. 26, 1963 now U.S. Patent No. 3,237,199.

This invention relates to a tire building apparatus for precision-built tires.

In its manufacture, a pneumatic tire is generally built upon a collapsible drum by placing thereon successive plies of rubberized fabric, locating tire beads at the lateral edges of the drum turning the ply ends around the beads, and placing a tread stock annulus around the plies to complete the assembly.

Positioning of these various components is extremely critical, for inaccuracy will invariably lead to an inferior tire having poor strength and riding qualities and short life.

It is therefore an object of this invention to provide a tire building apparatus for precision-built tires.

Another object is to provide a tire building apparatus having means to accurately align and manipulate the tire components.

Yet another object is to provide a tire building apparatus having means to very accurately position the tire beads concentrically with respect to the tire building drum.

Another object is to provide a tire building apparatus having bead locator segments radially expansible to register with the building drum segments.

Yet another object is to provide means at the ends of a tire building drum which, selectively, support the fabric ply ends, turn and stitch down said ends around tire beads in cooperation with bead locators, and assist in the stitching down of the tread.

It is a further object to provide a method for turning down ply ends and setting beads simultaneously.

These and other objects will become more apparent from reference to the following specification and drawings in which;

FIGURES 1 through 7 are somewhat diagrammatic views showing the progressive steps of assembling a tire on a building apparatus in accordance with the invention.

Operations

Figure 8:
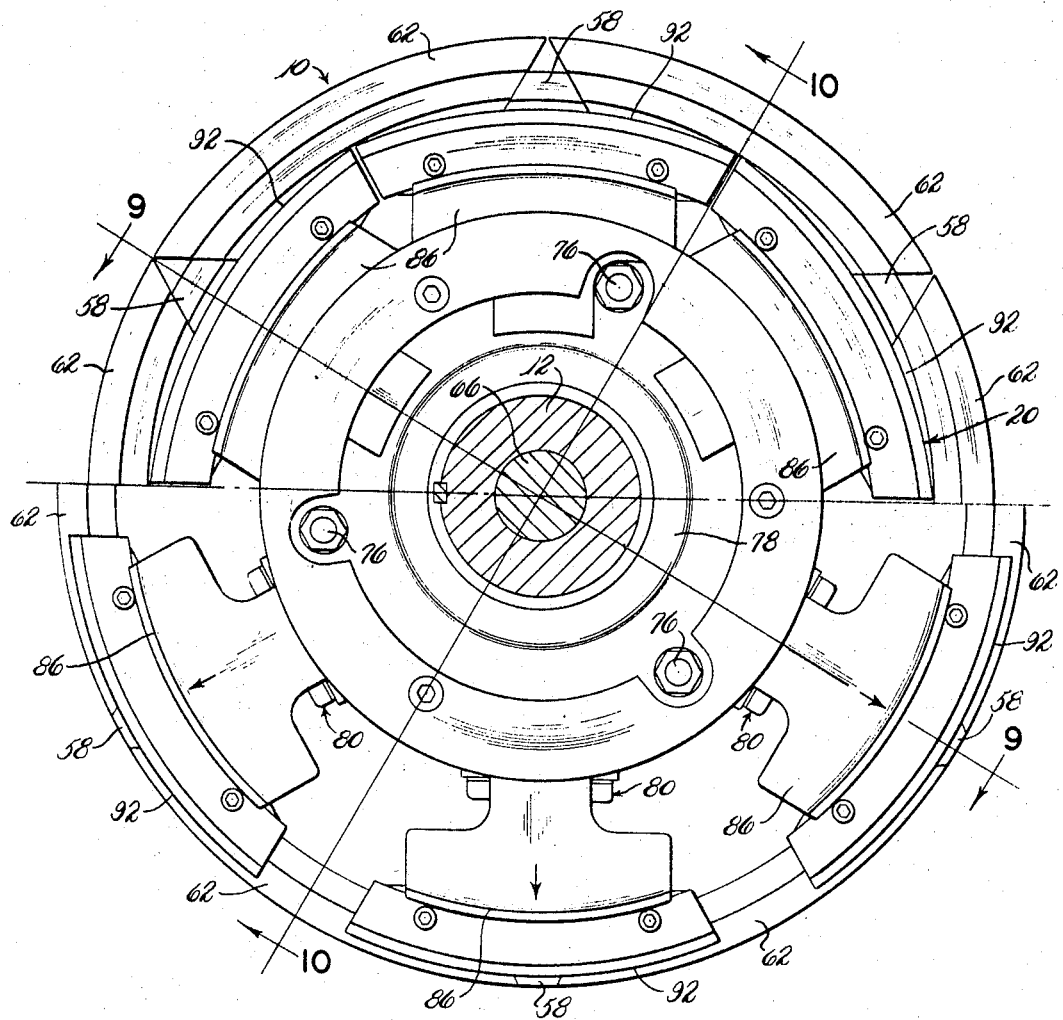
FIGURE 8 is an end elevation of the tire building drum of the invention with the portion of the drum above the centerline shown in contracted position and the portion below the centerline shown in expanded position.

Referring now to FIGURES 1–6, a tire building drum 10, is shown supported on a shaft 12 adapted for rotation by a conventional drive unit 14. At the opposite end of drum 10 is a support 16 adapted to be swung into and out of engagement with the drum shaft to allow for removal of a completed tire. At each end of the drum is provided a bead setting ring 18, a bead register means or ring assembly 20, and an assembly 22 of extension, stitch and turnover-support ring segments 96; each, except the bead register means or ring assembly, is adapted for axial movement and for selective radial expansion and contraction, as helper means as will be fully explained hereafter. For the sake of simplicity, only the apparatus and operations at one end of the drum will be described.

In FIGURE 1, the drum 10 is shown in the collapsed position with tire body plies P in place thereon. The bead setting ring 18 is in contracted position and retains a tire bead B. The helper ring segments 96 are in contracted position adjacent the building drum 10, supporting the ends E of the plies P. Next, as shown in FIGURE 2, the bead setting ring 18 is moved axially inwardly to span the clearance between the lateral edge of the drum 10 and the ring segments 22.

The drum 10 and the helper ring segments 96 are next expanded, as shown in FIGURE 3, which urges the plies P radially outwardly beyond the bead at both sides thereof, to bear against the inner periphery of the tire bead B, while it is retained about its outer periphery by the bead setting ring 18. The bead register means or ring assembly 20 is simultaneously expanded until its segments 86 register accurately with the drum 10 and bear against the inside face of the plies P at the bead, thus forcing the bead into concentricity with the drum. The beads are now positively and accurately located axially as well as concentrically with the drum. The radial expansion of the drum 10 also effects a slight radially inward flaring or turning down of the ply ends E, thereby obviating the necessity for performing the usual additional step of turning down the ply ends with acorn tools or stitcher apparatus.

Bead setting ring 18 is then expanded and/or expanded and withdrawn and the helper ring segments 96 are expanded further as shown in FIGURE 4, thereby expanding further the ply edge E. Ring segments 96 are now moved axially inwardly to turn and stitch the edge E back over the bead B, as shown in FIGURE 5.

Next, as seen in FIGURE 6, a tread T is placed around the plies P, while the ring segments 96 are in their axially innermost positions and supporting the edge of the tread. The drum is now rotated at a high rate of speed, the ends of the ring segments 96 (because of their novel construction as will be explained), are pivoted radially outwardly to lift the tread edge portion and thus prevent entrapment of air as a pair of stitchers 24, 24, commence stitching the tread to the plies P from the center of the tread axially outwardly toward the edges of the drum 10. As each stitcher progresses toward the edge of the drum 10, the ring segments 96 are slowly withdrawn ahead of the stitcher.

The drum 10, register ring segments 20 and helper ring segments 96 are then collapsed, the support 16 is swung away from the shaft 12, and the assembled tire 30 is removed, see FIGURE 7.

Drum details

Figure 9:
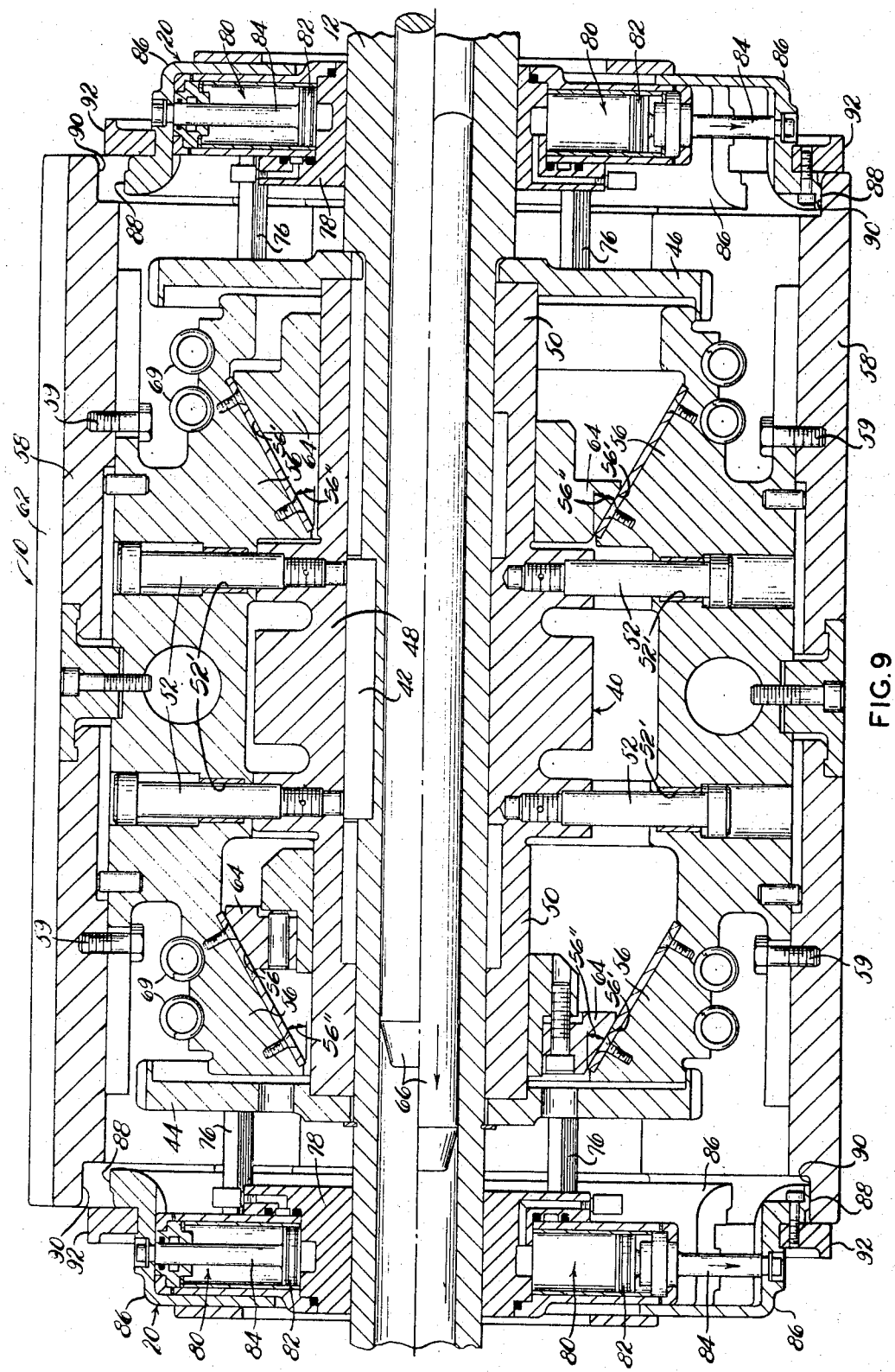
FIGURE 9 is a sectional view taken along line 9—9 of FIGURE 8 with the portion of the drum above the centerline shown in contracted position and the portion below the centerline shown in expanded position.
Figure 10:
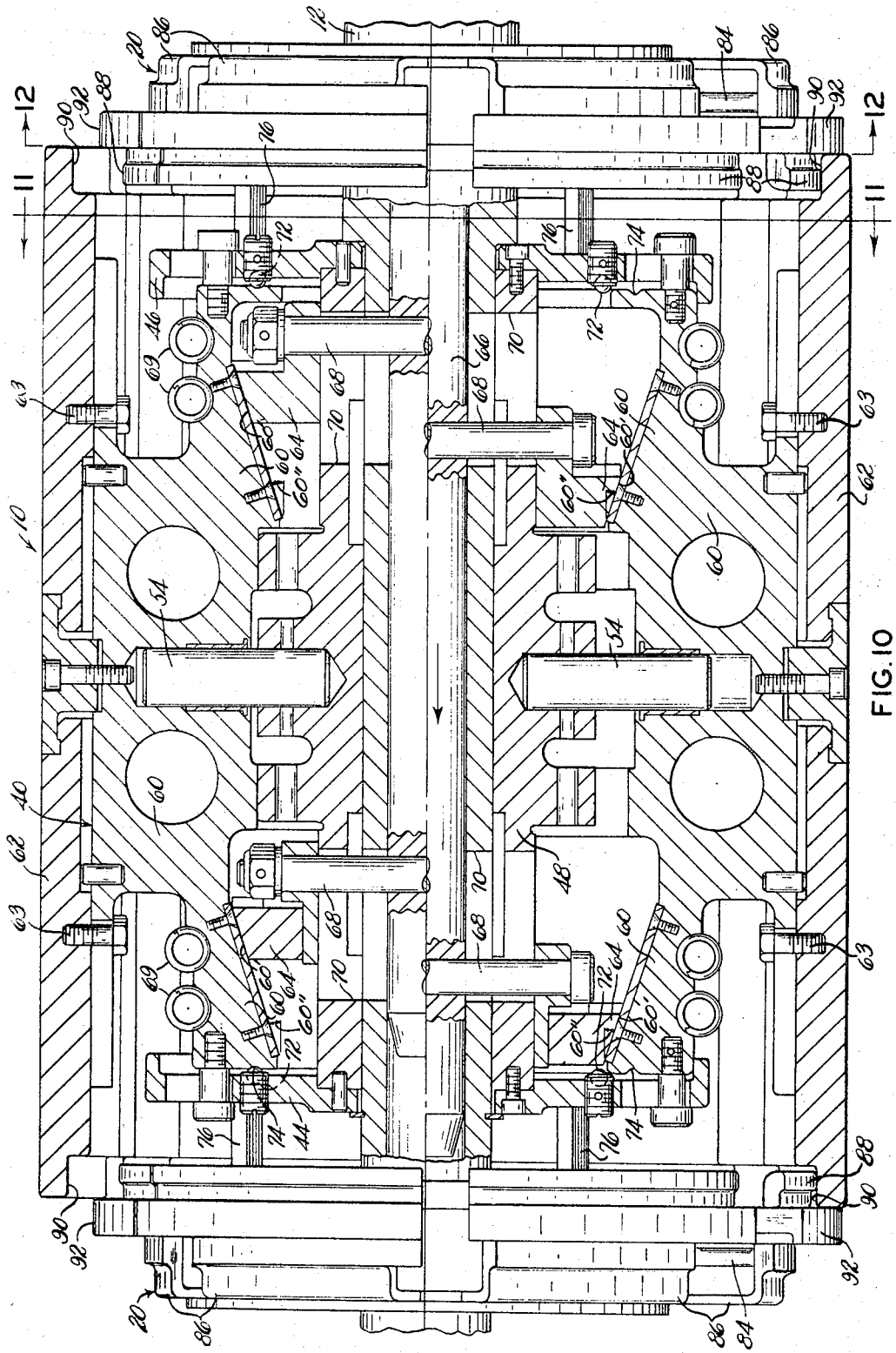
FIGURE 10 is a sectional view taken along line 10—10 of FIGURE 8 with the portion of the drum above the centerline shown in contracted position and the portion below the centerline shown in expanded position.
Figure 11:
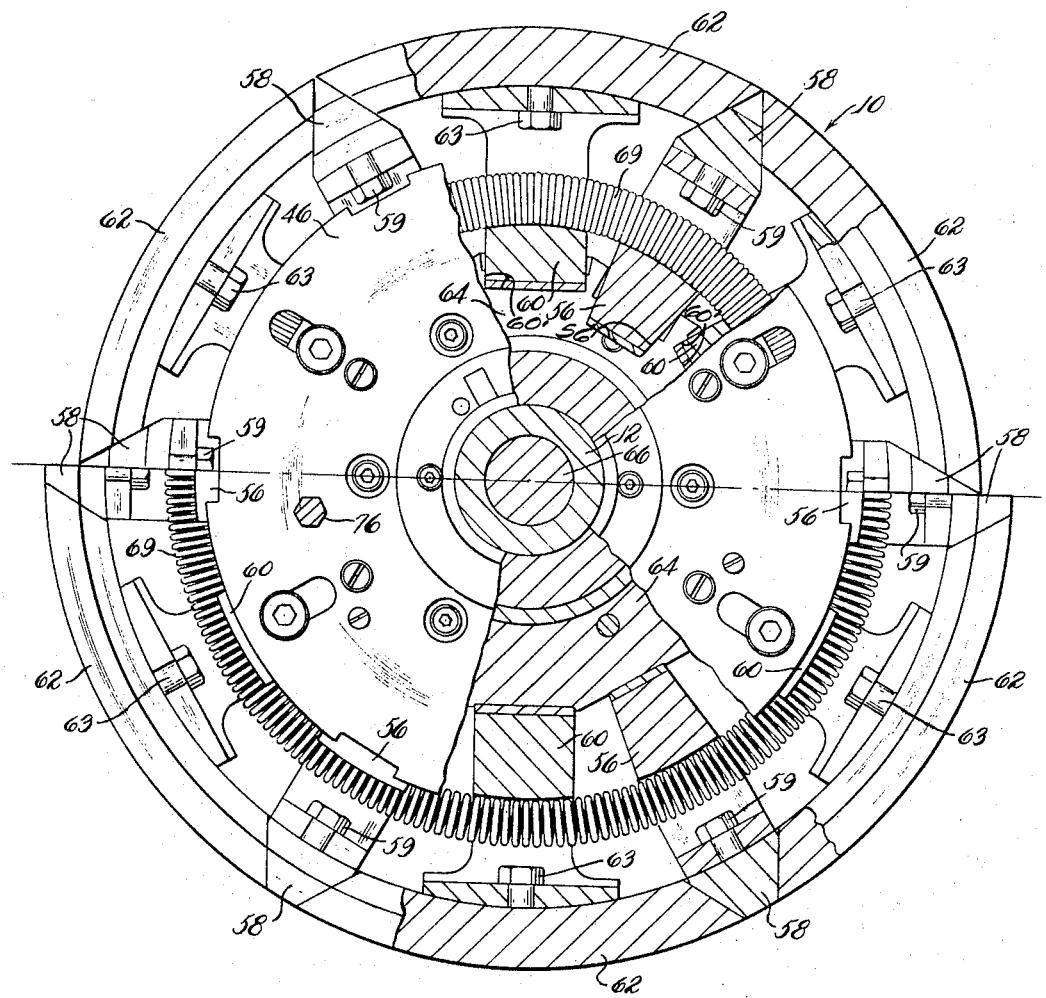
FIGURE 11 is a sectional view taken along line 11—11 of FIGURE 10, with parts broken away and with the portion of the drum above the centerline shown in contracted position and the portion below the centerline shown in expanded position.
Figure 12:
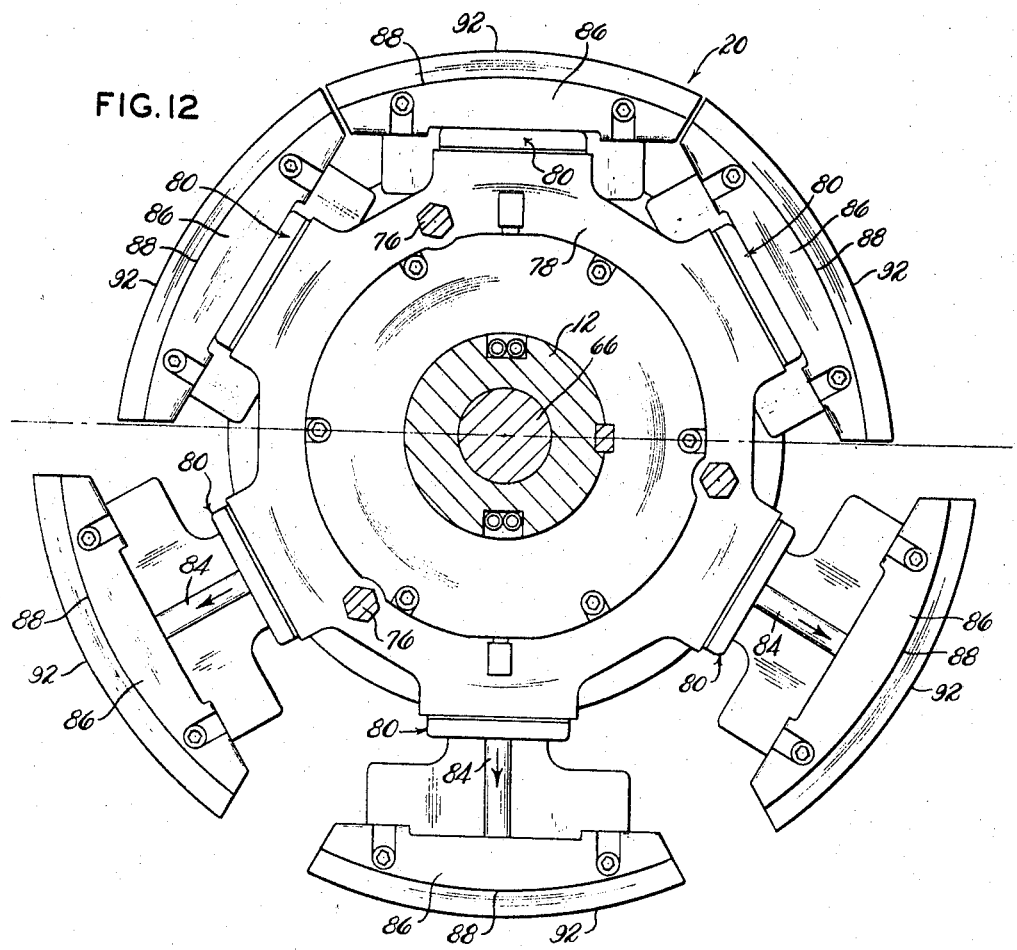
FIGURE 12 is a view taken along line 12—12 of FIGURE 10, with the portion of the drum above the centerline shown in contracted position and the portion below the centerline shown in expanded position.

The drum 10 comprises a hub 40 fastened to shaft 12 by a key 42. End plates 44 and 46 confine the hub 40 against axial movement. The hub 40 has an enlarged central portion 48 and reduced end portions 50, 50. The central portion has secured therein pairs of guide posts 52, 52, disposed in bores 52', 52', and dowels 54. Slidably mounted on posts 52, 52 are cam follower blocks 56 which mount small drum segments 58 by bolts 59. Slidably mounted on dowels 54 are cam follower blocks 60 which mount large drum segments 62 by bolts 63. Referring to FIGURES 9-11, radial expansion and contraction is imparted to the segments 58 and 62 through their respective cam follower blocks 56 and 60 by corresponding cam-slot surfaces 56' and 60' on sets of axially moving cams 64 connected to a slidable shaft 66, housed within shaft 12, by pairs of bolts 68, 68 that extend through slots 70 in shaft 12 and in end portions 50, 50 of hub 40.

The shaft 66 is reciprocated by conventional means, such as an air cylinder (not shown) within drive unit housing 14. As seen in the lower halves of FIGURES 9 and 10, extension of the shaft 66 moves cams 64, 64 axially to urge cam follower blocks 56 and 60, and drum segments 58 and 62, radially outwardly; upon contraction of shaft 66, pairs of garter springs 69, 69 return the blocks 56 and 60, and segments 58 and 62, to their contracted positions. Spring loaded balls 72 in end plates 44 and 46 cooperate with detents 74 in the lateral edges of end portions 50, 50 of hub 40 to maintain the blocks 56 and 60 in their contracted positions.

As clearly understood from the drawings by comparison of the collapsed condition of the drum 10 in FIGURE 1 to the expanding condition of FIGURE 3 and the fully expanded condition of FIGURE 5, the large drum segments 62 expand radially in advance of the small drum segments 58 during expansion of the drum 10. This relationship is further appreciated by comparison of the collapsed state of the segments 58 and 62 depicted above the centerline in FIGURE 11 to the expanded state shown below the centerline. Moreover, a person skilled in the art will understand that the wedging fit between the segments 58 and 62, as clearly shown in FIGURES 8 and 11, will permit only this mode of movement of the segments during radial expansion of the drum 10.

Similarly, as illustrated in the collapsing condition of the drum 10 of FIGURE 7 from the fully expanded state of FIGURE 5, the small segments 58 move radially inwardly in advance of the large segments 62 during collapsing of the drum 10. The structural and operational interrelation of segments 58 and 62 is also illustrated by the above-mentioned states of drum expansion and contraction and the wedging interfit of the segments as shown in FIGURES 8 and 11.

As is readily apparent from a comparison of FIGURES 9 and 10, upon extension of the shaft 66, the differential radial movement of the segments 58 and 62 with their respective cam followers 56 and 60 is effected by the difference in the angles of incline 56" and 60" of the cam followers 56 and 60 and their respective mating cam surfaces 56' and 60' with respect to the axis of the drum 10. This differential incline is also depicted in the difference in radial location of followers 56 and 60 in the fragmentary section view of FIGURE 11. For example, in one preferred embodiment of the drum 10, as actually reduced to practice prior to the filing of the above-identified parent application Ser. No. 275,891, angle 56" was about 29 degrees; while, angle 60" was about 18 degrees.

Mounted on shaft 12 at each edge of drum 10 and secured for rotation with each end plate 44 and 46 and spaced therefrom by spacers 76 are a plurality of circumferentially spaced bead register means 86, each comprised of a hub portion 78, a fluid-operated cylinder 80 within the hub portion 78 and having piston 82 and piston rod 84; secured to each piston rod 84 is a bead register segment 86 having an axial flange portion 88 which, upon outward motion of piston 82, registers with an axial recess 90 in drum segments 58 and 62. An axial tire bead support 92 is provided on each segment 86 and adjoins the edge of the drum 10.

Thus, as the bead register means is activated with the drum segments and the helper ring segments, the axial flanges 88 are placed positively against the inner axial recesses 90 of the drum; this places the axial bead support surfaces 92 in absolutely concentric relationship to the drum surface. Consequently, these bead support surfaces will force the bead into a true concentric location at the drum edge.

Drum segments 58 and 62 are removably secured to the hub 40 to permit interchangeability of segments, so that the drum may be changed in width to construct tires of various sizes.

By the same token, the spacers 76 between end plates 44 and 46 and the bead register ring segments 86 may be changed to alter the spacing therebetween; also, to accommodate different bead diameters, the ring segments comprising bead seats 92 may be made interchangeable.

Figure 13:
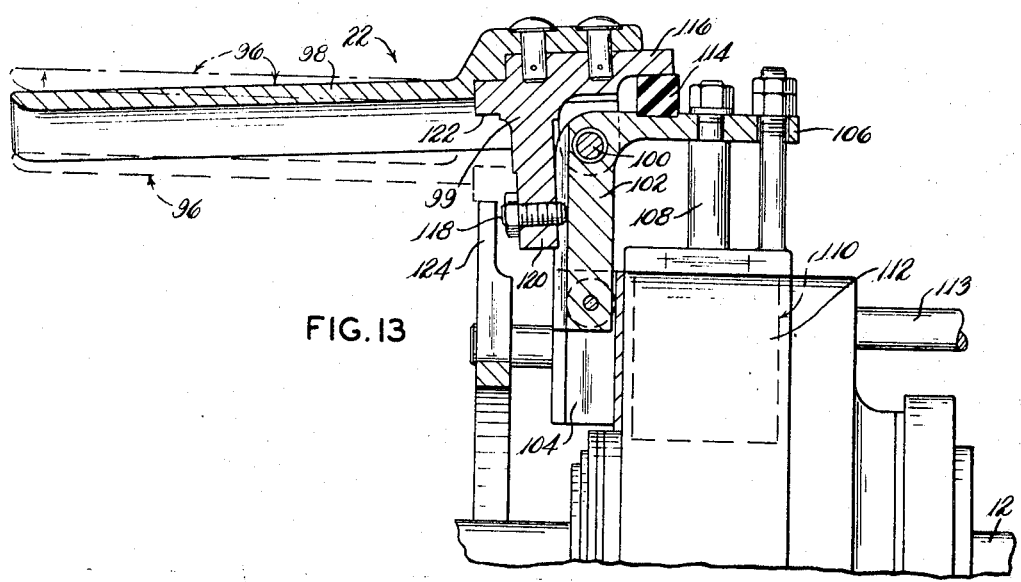
FIGURE 13 is an enlarged fragmentary longitudinal sectional view of one of the segments of the drum extension and ply turnover rings.

Each segment 96 of the helper means or ring assembly 22, as shown in FIGURE 13, comprises an arcuate, axially extending finger 98 secured to a bracket 99 mounted by a pivot 100 on a support 102 slidable radially within a guide 104. Radial motion is imparted to finger 98 through an axial leg 106 on support 102 by piston rod 108 of cylinder 110 within a housing 112 rotatably mounted on shaft 12 and axially movable by piston rod 113 of a cylinder not shown. Biasing of finger 98 is provided by a resilient member 114 between leg 106 and an axial leg 116 on bracket 99. Adjustment of the finger 98 and the degree of resiliency of member 114 is provided by a screw 118 in a radial leg 120 on bracket 99 which bears against support 102.

At the start of the tire building operation, with the drum and helper ring assembly 22 contracted, the fingers 98 are held fixed in horizontal positions by engagement of seats 112 on brackets 99 with annular ring 124, as shown in dotted lines, FIGURE 13. When the fingers 98 are expanded radially to cooperate with the registering ring segments 86, they are biased in the slanted position shown in full lines in FIGURE 13 by the resilient members 114 urging the axially outer ends radially outwardly about pivot 100.

During the ply turnover and stitching operation, the axially inner ends of fingers 98 are pivoted radially outwardly by engagement with the tire body on the drum, as indicated by the dot-dash lines in FIGURE 13. This pivotal motion of the fingers 98 is resisted by the resilient members 114, thereby providing improved stitching of the ply material around the tire beads.

After the tread T has been placed on the tire body, with fingers 98 still in position, high speed rotation of the tire drum and helper ring assembly 22 impart to the inner ends of fingers 98 a tendency to rise radially, thus helping to hold the edges of tread T away from the underlying tire body, as the assembly is removed axially ahead of the stitchers 24. This spacing of the tread edges prevents entrapment of air between tread and tire body.

While one form of the invention has been shown and described, various modifications will occur to those skilled in the art without departing from the scope of the invention as defined in the appended claims.

What is claimed is:

1. A collapsible tire building drum comprising, a plurality of segment assemblies arranged to form a continuous tire building surface, a shaft spaced within said segment assemblies adapted for rotating said drum, cam means attached to and adapted for axial movement relative to said shaft, cam follower means disposed between said cam means and said segment assemblies for collapsing and expanding the latter upon axial movement of said cam means relative to said shaft, said cam means including a plurality of recessed cam slots and a plurality of upstanding cam surfaces alternately disposed intermediate said recessed cam slots for moving certain of said segment assemblies radially in advance of other of said segment assemblies upon collapsing of the drum, and for moving said other of said segment assemblies radially in advance of said first mentioned segment assemblies upon expanding of the drum.

2. A collapsible tire building drum according to claim 1, including an endless extensible clamping means engaging said cam follower means for continuously biasing the latter radially inwardly relative to said cam means, said cam follower means having slotted portions thereon and said clamping means including at least one coiled spring received in said slotted portions.

3. A collapsible tire building drum comprising, a plurality of segment assemblies arranged to form a continuous tire building surface, a shaft spaced within said segment assemblies and adapted for rotating the drum, a pair of cam members attached to and adapted for axial movement relative to said shaft, a pair of oppositely disposed cam follower members depending from each of said segment assemblies and having cam follower surface portions adjacent one end thereof for collapsing and expanding said segment assemblies upon axial movement of said cam members relative to said shaft, an endless extensible clamping means engagingly coacting with an associated one of each of the pairs of cam follower members for continuously biasing the latter radially inwardly in camming relation against the respective of said cam members, each of said cam members including a plurality of recessed cam slots and a plurality of generally upstanding cam surfaces alternately disposed intermediate said recessed cam slots for moving certain of said segment assemblies radially in advance of other of said segment assemblies upon collapsing of the drum, and for moving said other of said segment assemblies radially in advance of said first mentioned segment assemblies upon expanding of the drum, and a guide assembly mounted on said shaft between said cam members and adapted for coacting engagement with said cam follower members to maintain precision radial movement of said segment assemblies during said collapsing and expanding movements of said drum.

References Cited

UNITED STATES PATENTS

| 2,500,193 | 3/1950 | Mallory et al. | 156—403 |
| 2,754,886 | 7/1956 | Bishop | 156—403 X |
| 3,178,331 | 4/1965 | Bishop et al. | 156—415 |
| 3,257,255 | 6/1966 | Batten | 156—131 X |

HAROLD ANSHER, *Primary Examiner.*

U.S. Cl. X.R.

156—131, 398, 403